United States Patent Office 3,135,982
Patented June 9, 1964

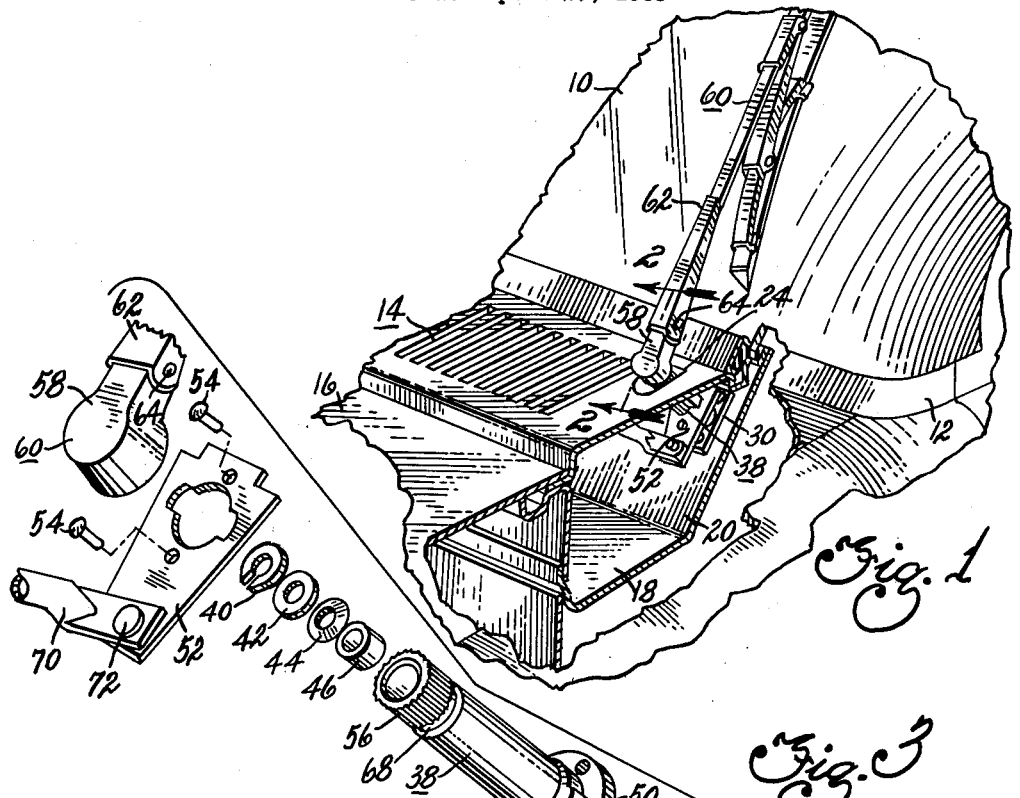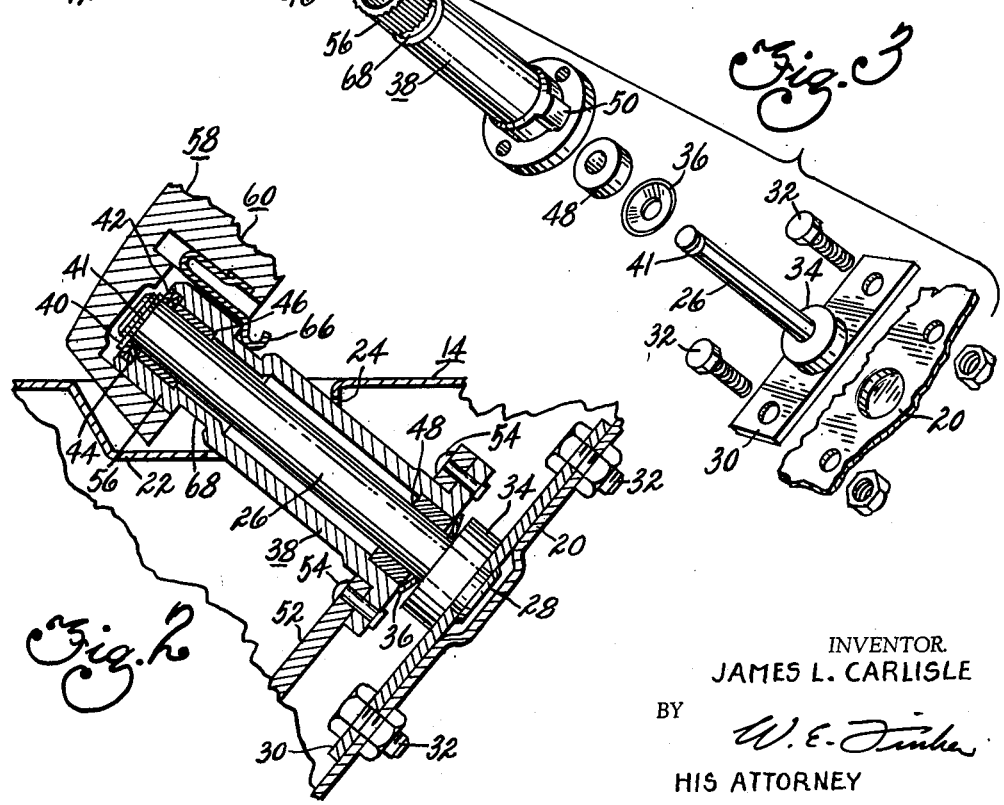

3,135,982
WINDSHIELD WIPER TRANSMISSION
James L. Carlisle, Rochester, Mich., assignor to General Motors Corporation, Detroit, Mich., a corporation of Delaware
Filed Apr. 29, 1963, Ser. No. 276,319
9 Claims. (Cl. 15—250.3)

This invention pertains to vehicular windshield wiping equipment, and particularly to an improved windshield wiper transmission assembly.

Heretofore, it has been the practice in vehicular windshield wiper equipment to rotatably support the pivot shafts of a pair of spaced transmission assemblies in either die cast or sheet metal housings. The stationary housings include a mounting flange by which it is attached to the vehicular body structure, and the pivot shaft projects outwardly from both ends of the stationary housing, the pivot shaft being attached to a wiper arm at one end, and suitable drive mechanism, in the form of a crank arm or a pulley, is attached to the other end of the pivot shaft. The present invention is directed to an improved transmission assembly wherein the pivot shaft is of tubular form and is rotatably supported and coaxially mounted on a stationary rod.

Accordingly, among my objects are the provision of an improved vehicular windshield wiper transmission assembly which reduces assembly time; the further provision of a pivot shaft assembly for a wiper transmission including a centrally mounted stationary support rod and a tubular co-axially arranged pivot shaft rotatably supported thereon; and the still further provision of an improved pivot shaft assembly of the aforesaid type wherein the tubular pivot shaft has an integral driver at one end and a drive link operatively connected with its opposite end.

The aforementioned and other objects are accomplished in the present invention by attaching the upstanding support rod to a mounting plate, and thereafter securing the mounting plate to the vehicle body structure. The tubular pivot shaft carrying spaced bushings is journalled on the support rod with a crank arm connected to its inner end and the mounting section of a wiper arm drivingly connected to its outer end.

Further objects and advantages of the present invention will be apparent from the following description, reference being had to the accompanying drawing, wherein a preferred embodiment of the present invention is clearly shown.

In the drawing:

FIGURE 1 is a fragmentary view with certain parts broken away depicting the improved windshield wiper transmission assembly of the present invention.

FIGURE 2 is an enlarged fragmentary sectional view taken along line 2—2 of FIGURE 1.

FIGURE 3 is an exploded perspective view of the components of the improved transmission assembly.

With reference to FIGURE 1, a portion of a vehicle is shown having a windshield 10 with a lower reveal molding 12, a louvered air inlet grille panel 14 and a cowl 16. A well, or plenum chamber, 18 is formed by a plenum top panel 20, this well being closed by the louvered grill panel 14.

As seen particularly in FIGURE 2 the louvered grille panel 14 is formed with a depression 22 having an opening 24 to accommodate the upper end of the transmission assembly, to be described. The transmission assembly, as seen particularly in FIGURES 2 and 3, comprises a stationary support rod 26 having its inner end staked at 28 to a mounting plate 30. The mounting plate 30 is shown attached by bolts 32 to the wall of the plenum top panel 20. A collar, or bushing, 34 is placed over the pivot support rod 26, and a conical spring washer 36 is placed on top of the collar 34. Thereafter, a hollow pivot shaft assembly 38 coaxial with the rod 26 is placed over the rod 26 and restrained against axial movement by a split lock washer, or retaining ring, 40 situated in a peripheral groove 41 of the support rod 26, a flat washer 42 and a conical spring washer 44 being situated between the lock washer 40 and the tubular pivot shaft assembly 38. It is thus apparent that the pivot shaft, although capable of slight axial movement relative to the support rod, is retained against disassembly therefrom. The tubular pivot shaft assembly 38 has press fitted therein bushings, or sleeve bearings 46 and 48, the inner ends of the pivot shaft assembly 38 having integral diametrical keys 50 which are received by a complementary opening in a crank arm 52. The crank arm 52 is rigidly attached to the tubular pivot shaft assembly 38 by rivets 54.

The upper end of the pivot shaft assembly 38 is formed with an integral knurled driver 56 adapted to receive the socket, or mounting section, 58 of a wiper arm 60. As is conventional, the wiper arm 60 includes a blade carrying section 62 spring hinge connected at 64 to the mounting section 58. Moreover, as shown in FIGURE 2, the mounting section 58 may include a spring latch 66, the hooked end of which is situated in an annular groove 68 of the pivot shaft assembly. A reciprocating drive link 70 operated by any suitable wiper motor which imparts to and fro movement thereto, is connected by a ball and socket joint 72 to the crank arm 52. The pivot shaft assembly 38 may comprise an integral die casting.

In assembling the improved wiper transmission assembly on a vehicle, the stationary support rod 26 is first attached to the plenum top panel 20, and the pivot shaft assembly 38 and its associated parts is thereafter telescoped over the stationary support rod and retained in position. The final assembly step comprises the attachment of the louvered grille panel 14 to the cowl after the wiper transmission assembly has been installed.

While the embodiment of the invention as herein disclosed constitutes a preferred form, it is to be understood that other forms might be adopted.

What is claimed is as follows:

1. A vehicular windshield wiper transmission assembly comprising, a stationary support member, a tubular pivot shaft journalled on said support member having a wiper arm receiving drive head at one end, and means attached to the opposite end of said tubular pivot shaft for imparting oscillatory movement thereto.

2. In a vehicle having a windshield with a plenum chamber disposed forwardly thereof, a wiper transmission assembly comprising a stationary support rod attached to a wall of said plenum chamber, a tubular pivot shaft journaled thereon, said pivot shaft having a wiper arm receiving driver at one end thereof located outside of said plenum chamber, and means attached to said pivot shaft and disposed within said plenum chamber for imparting oscillatory movement thereto.

3. A vehicular windshield wiper transmission assembly comprising, a stationary support member, a tubular pivot shaft coaxial with said support member and journalled thereon, said pivot shaft having a wiper arm receiving driver at one end thereof, and means attached to the opposite end of said tubular pivot shaft for imparting oscillatory movement thereto.

4. A vehicular windshield wiper transmission assembly comprising, a stationary support rod, a tubular pivot shaft coaxial with said support rod and journalled thereon, means retaining said tubular pivot shaft against substantial axial movement relative to said support rod, said pivot shaft having a wiper arm receiving driver at one end thereof, and a crank arm attached to the opposite end of said tubular pivot shaft for imparting oscillatory movement thereto.

5. In a vehicle having a windshield with a plenum chamber disposed forwardly thereof, a wiper transmission assembly comprising a stationary support rod attached to a wall of said plenum chamber, a tubular pivot shaft coaxial with said support rod and journalled thereon, a louvered grille panel covering the top of said plenum chamber and having an opening through which said pivot shaft projects, said pivot shaft having a wiper arm receiving driver at one end thereof located externally of said louvered grille panel, and means attached to said pivot shaft and disposed within said plenum chamber for imparting oscillatory movement thereto.

6. The combination set forth in claim 5 wherein said tubular pivot shaft comprises a die casting and wherein said driver is integrally formed therewith.

7. The combination set forth in claim 5 wherein said means for imparting oscillatory movement to said pivot shaft comprises a crank arm.

8. A vehicular windshield wiper transmission assembly comprising, a stationary support rod, a tubular pivot shaft coaxial with said support rod and journalled thereon, said pivot shaft having a wiper arm receiving driver at one end thereof and crank receiving key means at the opposite end, means retaining said pivot shaft in assembled relation with said rod while permitting slight axial movement thereof relative to said rod including a spring washer at each end of said tubular pivot shaft, and a crank arm attached to said opposite end of said tubular pivot shaft and receiving said key means for imparting oscillatory movement thereto.

9. The combination set forth in claim 8 wherein the outer end of said support rod has an annular groove, and wherein said tubular pivot shaft is retained in assembled relation with said rod by a retaining ring situated in said groove.

References Cited in the file of this patent
FOREIGN PATENTS

| | | |
|---|---|---|
| 462,833 | Great Britain | Mar. 17, 1937 |
| 1,145,453 | France | May 7, 1957 |